(12) United States Patent
Lee et al.

(10) Patent No.: US 7,304,006 B2
(45) Date of Patent: Dec. 4, 2007

(54) HIGH TEAR INTERWOVEN BELT FABRIC

(75) Inventors: Eun Kyung Lee, Clayton, NC (US); Edwin Lee Haines, Wake Forest, NC (US); Douglas Brooks Deans, Middlesex, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 199 days.

(21) Appl. No.: 10/875,972

(22) Filed: Jun. 24, 2004

(65) Prior Publication Data

US 2005/0287893 A1    Dec. 29, 2005

(51) Int. Cl.
*D03D 11/00* (2006.01)
(52) U.S. Cl. .................. 442/207; 442/86; 442/104; 442/148; 442/164; 442/168; 442/203; 442/208; 442/218; 442/220; 139/408
(58) Field of Classification Search .............. 442/203, 442/207, 208, 218, 86, 104, 148, 164, 220, 442/168; 139/408
See application file for complete search history.

(56) References Cited

U.S. PATENT DOCUMENTS

| | | | |
|---|---|---|---|
| 2,088,447 A | 7/1937 | Specht | |
| 3,325,909 A * | 6/1967 | Clark | 34/95 |
| 4,071,050 A * | 1/1978 | Codorniu | 139/383 R |
| 4,149,571 A * | 4/1979 | Burroughs | 139/383 A |
| 4,202,382 A * | 5/1980 | Westhead | 139/383 A |
| 4,231,401 A | 11/1980 | Matuska | 139/383 |
| 4,423,755 A * | 1/1984 | Thompson | 139/383 A |
| 4,437,496 A | 3/1984 | Thompson | 139/383 |
| 4,750,529 A * | 6/1988 | Watanabe | 139/383 R |
| 4,998,569 A * | 3/1991 | Tate | 139/383 A |
| 5,376,440 A * | 12/1994 | Koseki | 442/203 |
| 5,436,065 A * | 7/1995 | Fukamoto et al. | 442/220 |
| 5,837,623 A * | 11/1998 | Howland | 442/189 |
| 5,846,890 A * | 12/1998 | Deschamps | 442/203 |
| 5,944,062 A | 8/1999 | Gampe | |
| 6,328,077 B1 | 12/2001 | Mol | 139/383 |

FOREIGN PATENT DOCUMENTS

| | | |
|---|---|---|
| EP | 0 435 205 A | 7/1991 |
| EP | 0 668 382 A | 8/1995 |
| FR | 2568275 A | 1/1986 |
| GB | 994 474 A | 6/1965 |
| GB | 1 005 243 A | 9/1965 |

OTHER PUBLICATIONS

European Patent Office, European Search Report in related European Application No. 05 10 5320 dated Jul. 13, 2006 (3 pages).

* cited by examiner

*Primary Examiner*—Andrew Piziali
(74) *Attorney, Agent, or Firm*—Wood, Herron & Evans, LLP

(57) ABSTRACT

Woven reinforcing fabrics for such conveyor belts characterized by an improved resistance to tearing in the longitudinal or travel direction. The woven reinforcing fabric includes a plurality of weft yarns and a plurality of warp yarns aligned substantially orthogonal to the plurality of weft yarns. The warp yarns are woven through the weft yarns to define a plurality of passages arranged in substantially parallel first and second planes. At least one of the weft yarns is positioned in each of the passages and two of the weft yarns are positioned in at least one of the passages in each of the first and second planes.

19 Claims, 2 Drawing Sheets

HIGH TEAR INTERWOVEN BELT FABRIC

FIELD OF THE INVENTION

The present invention relates to interwoven fabrics and, in particular, to woven fabrics for use in reinforcing conveyor belts.

BACKGROUND OF THE INVENTION

Endless belts are used in a number of different abusive environment applications, such as conveyor belts used in various material handling applications such as package handling. Conventional conveyor belts consist of a woven reinforcing fabric embedded inside a flexible matrix of polyvinyl chloride or the like. The reinforcing fabric is woven by interlacing multiple warp yarns with multiple weft yarns. The warp yarns extend in the longitudinal or travel direction of the belt, and the weft yarns are placed at right angles to the warp yarns. The breaking strength of the warp yarns defines the tensile strength of the belt.

Conveyor belts are susceptible to lengthwise tearing parallel to the direction of belt travel and parallel to the direction of the warp yarns if foreign objects originating from the conveyed material wedge or lodge in the conveyor structure and maintain a stationary contacting position relative to the moving belt. For example, such foreign objects may be trapped or pinched at the transfer junction between adjacent conveyors in a material handling system. The tearing susceptibility arises from the inability of the reinforcing fabric inside the belt to resist the force applied by the stationary foreign object. The belt's tear strength is dependent primarily upon the breaking strength of the weft yarns and how those yarns are oriented for resisting the stress applied by the foreign object. The reinforcing fabrics of conventional conveyor belts lack sufficient tear strength to prevent longitudinal tearing due to contact by such stationary foreign objects.

What is needed, therefore, is a reinforcing fabric for a conveyor belt characterized by an increased tear resistance in the direction of travel.

SUMMARY OF INVENTION

The invention is generally directed to conveyor belts and, in particular, to woven reinforcing fabrics used in conveyor belts that are characterized by superior properties, such as an improved resistance to tearing in the longitudinal or travel direction. In one embodiment, the fabric includes a plurality of warp yarns woven substantially orthogonal to a plurality of weft yarns. The warp yarns are interlaced with the weft yarns to define a plurality of passages arranged in substantially parallel first and second planes. At least one of the weft yarns is positioned in each of the passages and two of the weft yarns are positioned in at least one of the passages in each of the first and second planes.

In another embodiment of the invention, the fabric includes a plurality of warp yarns woven substantially orthogonal to a plurality of weft yarns. The warp yarns are interlaced through the weft yarns to define a plurality of passages arranged in substantially parallel first and second planes. Two of the weft yarns are positioned in each of the passages.

Various additional advantages and features of the invention will become more readily apparent to those of ordinary skill in the art upon review of the following detailed description taken in conjunction with the accompanying drawings.

DETAILED DESCRIPTION OF DRAWINGS

DETAILED DESCRIPTION OF PREFERRED EMBODIMENTS

Figure 1:
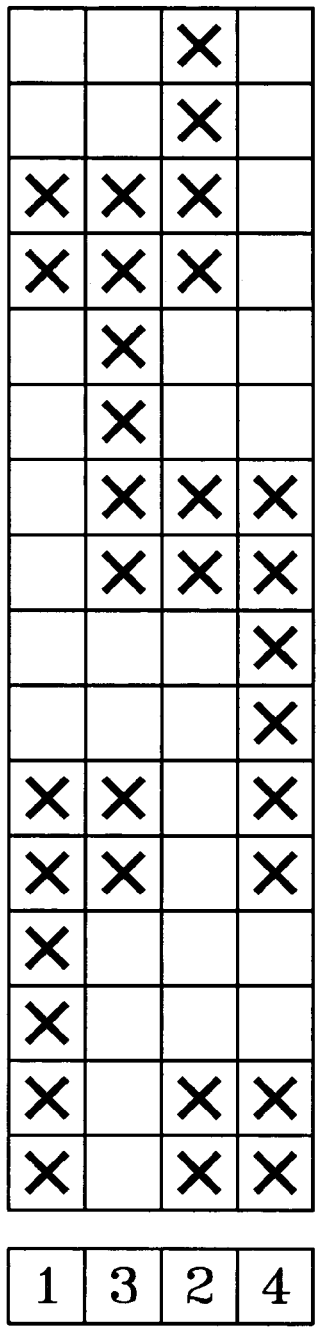
FIG. 1 is a diagrammatic view of a weave pattern in accordance with the principles of the invention.

With reference to FIG. 1, a repeating weave pattern is shown that is representative of the woven reinforcing fabric of the invention. The vertical columns of squares in the weave pattern represent warp yarns and the horizontal rows represent weft yarns. An empty square at the intersection of a row and column indicates that the corresponding weft yarn overlies the corresponding warp yarn. Similarly, a filled-in square indicates that the corresponding warp yarn overlies the corresponding weft yarn.

When the woven fabric of the invention is woven, the weave pattern, which is read from left to right and from bottom to top, is repeated for a number of times sufficient to yield a woven fabric of a targeted width and length. Warp yarns are sequentially raised and lowered, as specified by the weave pattern, and the weft yarns are inserted or picked into a shed or passage formed by the raised and lowered warp yarns. The pattern of FIG. 1 is a 2×1 interwoven broken twill having two picks in every shed.

With continued reference to FIG. 1, the initial shedding instruction is to raise all warp yarns except the third, which is lowered. The first and second weft yarns are picked. The second shedding instruction is to lower all warp yarns except the first, which is raised. The third and fourth weft yarns are picked. The third shedding instruction is to raise all warp yarns except the second, which is lowered. The fifth and sixth weft yarns are picked. The fourth shedding instruction is to lower all warp yarns except the fourth, which is raised. The seventh and eighth weft yarns are picked. The fifth shedding instruction is to raise all warp yarns except the first, which is lowered. The ninth and tenth weft yarns are picked. The sixth shedding instruction is to lower all warp yarns except the first, which is raised. The eleventh and twelfth yarns are picked. The seventh shedding instruction is to raise all warp yarns except the fourth, which is lowered. The thirteenth and fourteenth weft yarns are picked. The final shedding instruction is to lower all warp yarns except the second, which is raised. The fifteenth and sixteenth weft yarns are picked to conclude the weave pattern.

Figure 2:
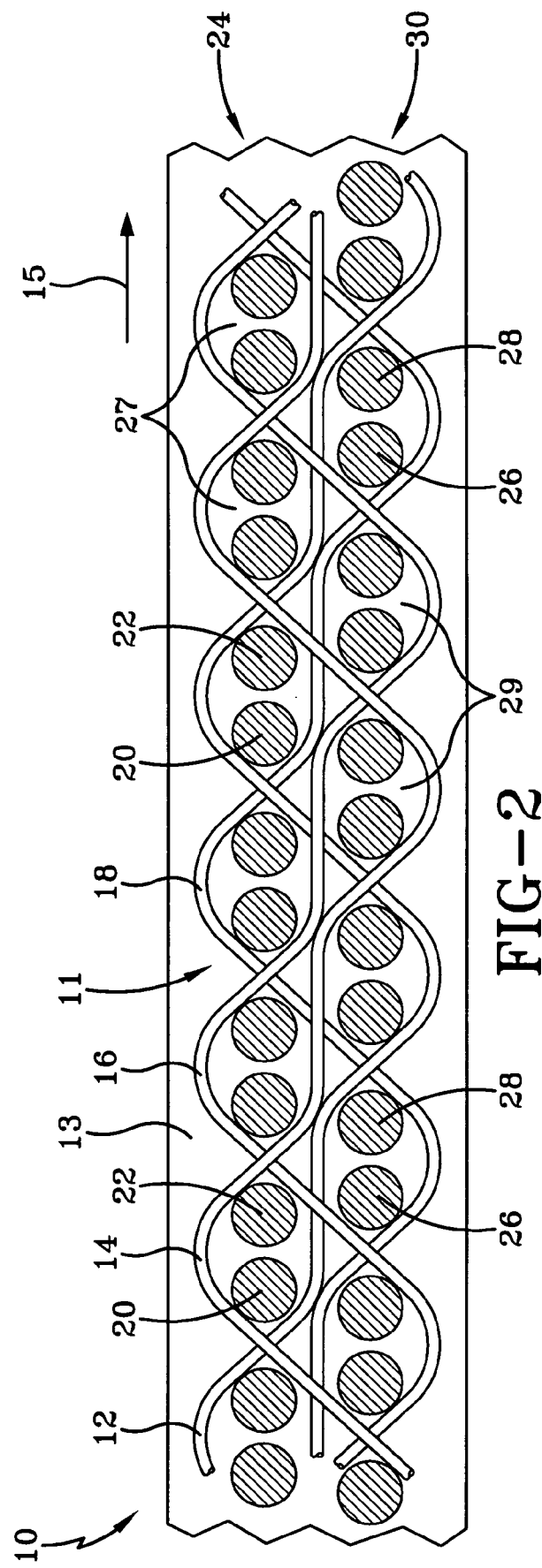
FIG. 2 is a longitudinal section of a belt including a woven fabric in accordance with the weave pattern of FIG. 1.

With reference to FIG. 2, a belt 10 generally includes a woven reinforcing fabric 11 encased or encapsulated inside a matrix 13, such as polyvinyl chloride, urethane, silicone rubber, or the like, having sufficient flexibility to protect the fabric and remain in contact during use. The belt 10 may be used in a single-ply belt structure or in a multiple-ply belt structure. Fabric 11 includes a plurality of warp yarns 12, 14, 16, 18 that extend in the travel or longitudinal direction 15 of belt 10. Multiple coplanar pairs of weft yarns 20, 22 are arranged in a first plane or layer, generally indicated by reference numeral 24, and are placed at right angles to the warp yarns 12, 14, 16, 18. Multiple coplanar pairs of weft yarns 26, 28 are arranged in a second layer or plane, generally indicated by reference numeral 30, and are also placed at right angles to the warp yarns 12, 14, 16, 18. Portions of the matrix 13 fill and occupy the otherwise empty spaces between the yarns 12, 14, 16, 18, 20, 22.

The warp yarns 12, 14, 16, 18 are woven with the pairs of weft yarns 20,22 and the pairs of weft yarns 26, 28 as provided by the weave pattern of FIG. 1. Adjacent pairs of weft yarns 20, 22 in first layer 24 are separated laterally by two of the warp yarns 12, 14, 16, 18. Similarly, adjacent pairs of weft yarns 26, 28 in second layer 30 are separated laterally by two of the warp yarns 12, 14, 16, 18. Each individual pair of weft yarns 20, 22 is separated vertically from the adjacent pairs of weft yarns 26, 28 by three of the warp yarns 12, 14, 16, 18. The pairing of the weft yarns 20, 22 in each shed or passage 27 in one distinct layer 24 and the pairing of weft yarns 26, 28 in each shed or passage 29 in another distinct layer 30 parallel to layer 24 increases the tear strength of the woven reinforcing fabric 11 in the longitudinal direction 15.

The passages 27, 29 preferably have substantially equal cross-sectional areas viewed parallel to the longitudinal direction 15, although the invention is not so limited, and are arranged in distinct layers 24, 30. Adjacent passages 27 and pairs of weft yarns 20, 22 in layer 24 and adjacent passages 29 and pairs of weft yarns 26, 28 in layer 30 are separated by two of the warp yarns 12, 14, 16, 18. The specific warp yarns 12, 14, 16, 18 separating the passages 27, 29 depends upon the location in the weave pattern of FIG. 1 and the specific layer 24, 30 in the woven fabric 11. Each passage 27 and pairs of weft yarns 20, 22 in layer 24 is adjacent to, but in a different plane than, two nearest-neighbor passages 29 and two pairs of weft yarns 26, 28 in layer 30 and separated from the nearest neighbor passages 29 by two of the warp yarns 12, 14, 16, 18. Similarly, each passage 29 and pair of weft yarns 26, 28 in layer 30 is adjacent to, but in a different plane than, two nearest-neighbor passages 27 and pairs of weft yarns 20, 22 in layer 24 and separated from the nearest neighbor passages 27 by two of the warp yarns 12, 14, 16, 18. In the embodiment illustrated in FIG. 2, each of the warp yarns 12, 14, 16, 18 is aligned substantially parallel to the first and second layers 24, 30 when disposed between one of the plurality of passages 27 in layer 24 and one of the nearest neighbor passages 29 in layer 30.

The warp yarns 12, 14, 16, 18 may be smaller in diameter or, equivalently, have a lighter denier than, the weft yarns 20, 22, 26, 28. In certain embodiments, weft yarns 20 and 22 have the same diameter and, similarly, each weft yarn 26 has the same diameter as weft yarn 28. In other embodiments, weft yarns 20 and 22 have different diameters and, similarly, weft yarns 26 and 28 have different diameters. In still other embodiments, the weft yarns 20, 22, 26, 28 all have substantially the same diameter.

The warp yarns 12, 14, 16, 18 and the weft yarns 20, 22, 26, 28 may be formed from any synthetic monofilaments or fibers conventionally used in such woven reinforcing fabrics 11. Exemplary materials include polyesters, polyamides, and copolymers and blends of these materials, although the invention is not so limited.

In an exemplary embodiment of the invention, belt 10 incorporating the woven reinforcing fabric 11 has a thickness of about 0.05" to about 0.30" and an application-dependent width. The fabric 11 is coated with a matrix 13 of polyvinyl chloride. All warp yarns 12, 14, 16, 18 are about 4,100 denier or about 0.65 mm in diameter and all weft yarns 20, 22, 26, 28 are about 11,000 denier or about 1.05 mm in diameter. The yarns 12-28 are formed from a blend of polyester and polyamide.

The pairing of the weft yarns 20, 22, the pairing of weft yarns 26, 28, and the weaving pattern of FIG. 1, in combination with the arrangement of all weft yarns 20, 22 in a distinct layer 24 and all weft yarns 26, 28 in a distinct layer 30 substantially parallel to layer 24 cooperate to endow the woven reinforcing fabric 11 with an improved tear strength. In this embodiment, the improvement results from having to sever pairs of weft yarns to form a tear in the longitudinal direction 15, as compared with tearing single weft yarns in conventional woven reinforcing fabrics.

Figure 3:
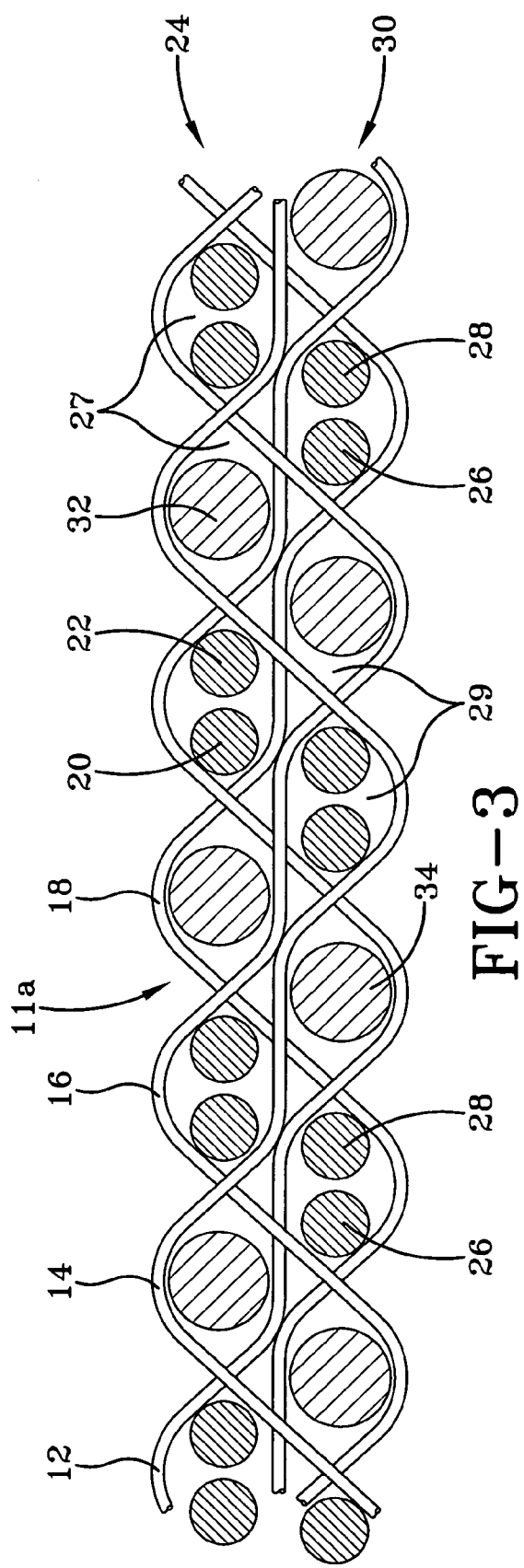
FIG. 3 is a longitudinal section view similar to FIG. 2 of a woven fabric for a belt in accordance with an alternative embodiment of the invention.

With reference to FIG. 3 in which like reference numerals refer to like features in FIG. 2 and in accordance with an alternative embodiment of the invention, a woven reinforcing fabric 11a includes a single weft yarn 32 positioned between adjacent pairs of weft yarns 20, 22 in layer 24 and, similarly, a single weft yarn 34 positioned between adjacent pairs of weft yarns 26, 28 in layer 30. The diameter of each individual weft yarn 32, 34 is greater than the diameter of each individual weft yarn 20, 22, 26, 28. Although fifty (50) percent of passages 27 and fifty (50) percent of passages 29 are illustrated as having a single weft yarn 32 or 34, respectively, the invention contemplates that the distribution percentage may differ. For example, thirty (30) percent of passages 27 may include a single weft yarn 32 and sixty (60) percent of passages 29 may include a single weft yarn 34. In certain alternative embodiments, either layer 24 or layer 30 may have a construction as shown in FIG. 2 and the other of layers 24, 30 may be constructed as shown in FIG. 3.

Figure 4:
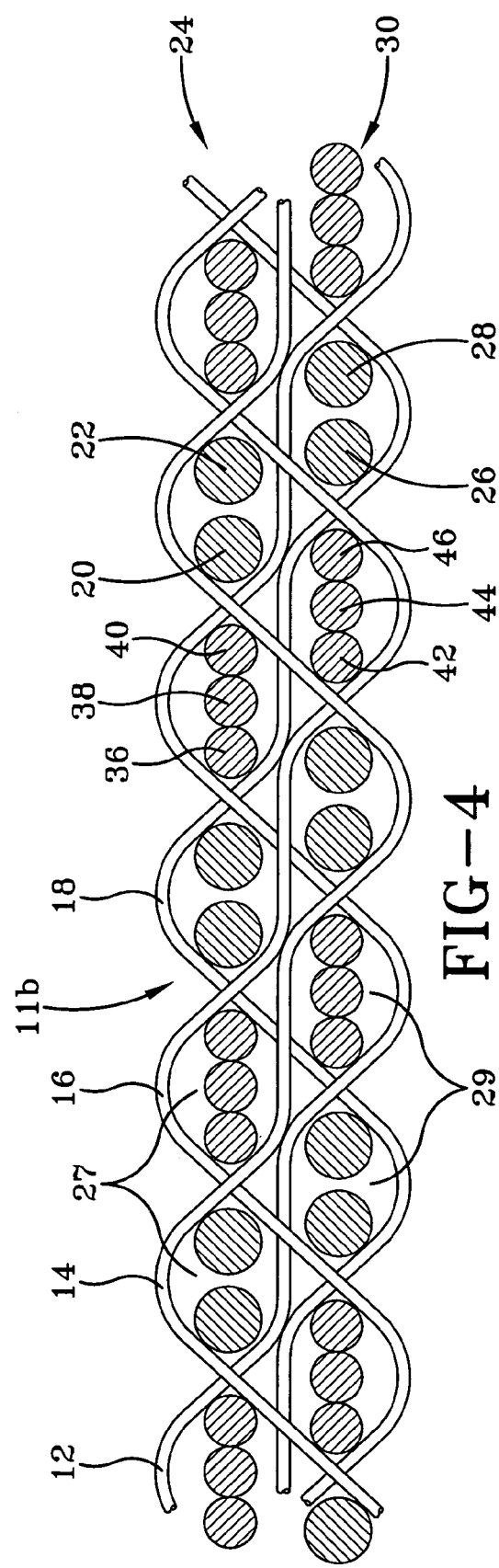
FIG. 4 is a longitudinal section view similar to FIG. 2 of a woven fabric for a belt in accordance with yet another alternative embodiment of the invention.

With reference to FIG. 4 in which like reference numerals refer to like features in FIG. 2 and in accordance with an alternative embodiment of the invention, a woven reinforcing fabric 11b includes three weft yarns 36, 38, 40 positioned between adjacent pairs of weft yarns 20, 22 in layer 24 and, similarly, three weft yarns 42, 44, 46 positioned between adjacent pairs of weft yarns 26, 28 in layer 30. The diameter of each individual weft yarn 36-46 is smaller than the diameter of each individual weft yarn 20, 22, 26, 28. Preferably, weft yarns 36, 38, 40 have the same diameter and, similarly, weft yarns 42, 44, 46 have the same diameter. Although fifty (50) percent of passages 27 and fifty (50) percent of passages 29 are illustrated as having weft yarns 36, 38, 40 or weft yarns 42, 44, 46, respectively, the invention contemplates that the distribution percentage may differ. For example, forty (40) percent of passages 27 may include a set of weft yarns 36, 38, 40 and forty-five (45) percent of passages 29 may include a set of weft yarns 42, 44, 46. In certain alternative embodiments, either layer 24 or layer 30 may have a construction as shown either in FIGS. 2 or 3 and the other of layers 24, 30 may be constructed as shown in FIG. 4.

The woven reinforcing fabric 11 of the invention has an improved tear resistance and tear strength in the longitudinal direction 15 as compared with conventional woven reinforcing fabric constructions for conveyor belts. In accordance with the various embodiments of the invention, the improvement is due to the construction of the weave pattern that requires the presence of more than one weft yarn (weft yarns 20, 22, 26, 28; weft yarns 36-46) in at least one passage 27, 29 in each of the first and second layers 24, 30. Conventional woven reinforcing fabrics have a single weft yarn in each of these passages, which does not supply sufficient tear strength to resist tearing in the belt travel direction due to stationary objects trapped in the conveyor.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein we claim:

The invention claimed is:

1. A conveyor belt for material handling, comprising:
   a matrix; and
   a woven fabric encased in said matrix, said woven fabric including a plurality of weft yarns arranged in substantially parallel first and second layers and a plurality of warp yarns woven substantially orthogonal to said plurality of weft yarns, a first one of said warp yarns woven in sequence over a first pair of said weft yarns in said first layer, between said first pair of said weft yarns in said first layer and a second pair of weft yarns in said first layer, between said second pair of said weft yarns in said first layer and a first pair of said weft yarns in said second layer in a direction substantially parallel to said first and second layers, between said first pair of said weft yarns in said second layer and a second pair of said weft yarns in said second layer in a space aligned below a third pair of said weft yarns in said first layer, under said second pair of said weft yarns in said second layer, between said second pair of said weft yarns in said second layer and a third pair of said weft yarns in said second layer, and between a fourth pair of said weft yarns in said first layer and a fifth pair of said weft yarns in said first layer, said third pair of said weft yarns in said first layer being adjacent said second pair of said weft yarns in said first layer and said fourth pair of said weft yarns in said first layer;
   wherein each of said first, second, and third pairs of said weft yarns in said second layer are aligned between two of said first, second, third, fourth, and fifth pairs of said weft yarns in said first layer such that said pairs of said weft yarns in said second layer are offset in a longitudinal direction of the belt from said pairs of said weft yarns in said first layer.

2. The conveyor belt of claim 1 wherein each of said plurality of warp yarns is smaller in diameter that any of said plurality of weft yarns.

3. The conveyor belt of claim 2 wherein said plurality of weft yarns have substantially equal diameters.

4. The conveyor belt of claim 1 wherein said plurality of weft yarns and said plurality of warp yarns are formed from a material selected from the group consisting of polyesters, polyamides, and copolymers and blends of these polymers.

5. The conveyor belt of claim 1 wherein said plurality of weft yarns and said plurality of warp yarns are woven in a 2×1 interwoven broken twill pattern.

6. The conveyor belt of claim 1 wherein said first and second pairs of said weft yarns in said first layer are adjacent to each other.

7. The conveyor belt of claim 1 wherein said first and second pairs of said weft yarns in said second layer are adjacent to each other.

8. The conveyor belt of claim 7 wherein said second and third pairs of said weft yarns in said second layer are adjacent to each other.

9. The conveyor belt of claim 1 wherein a second one of said warp yarns is woven in sequence over said second pair of said weft yarns in said first layer, between said second pair of said weft yarns in said first layer and third pair of weft yarns in said first layer, between said third pair of said weft yarns in said first layer and second pair of said weft yarns in said second layer in a direction substantially parallel to said first and second layers, between said second pair of said weft yarns in said second layer and said third pair of said weft yarns in said second layer, and under said third pair of said weft yarns in said second layer.

10. The conveyor belt of claim 9 wherein said second one of said warp yarns is further woven in sequence between said third pair of said weft yarns in said second layer and a fourth pair of said weft yarns in said second layer, and between said fifth pair of said weft yarns in said first layer and a sixth pair of said weft yarns in said first layer adjacent to said fifth pair of said weft yarns in said first layer.

11. The conveyor belt of claim 10 wherein said third and fourth pairs of said weft yarns in said second layer are adjacent to each other.

12. The conveyor belt of claim 11 wherein said third pair of said weft yarns in said second layer intervenes between said second and fourth pairs of said weft yarns in said second layer.

13. The conveyor belt of claim 10 wherein said fifth pair of said weft yarns in said first layer intervenes between said fourth pair of said weft yarns in said first layer and said sixth pair of said weft yarns in said first layer.

14. A conveyor belt for material handling, comprising:
   a matrix; and
   a woven fabric encased in said matrix, said woven fabric including a plurality of weft yarns arranged in substantially parallel first and second layers to define a plurality of passages in said first and second layers and a plurality of warp yarns woven substantially orthogonal to said plurality of weft yarns through said plurality of passages, said plurality of passages including successive first, second, third, fourth, and fifth passages in said first layer and successive first, second, and third passages in said second layer, a first one of said warp yarns woven in sequence over a weft yarn in said first passage in said first layer, between said weft yarn in said first passage in said first layer and a weft yarn in said second passage in said first layer, between said weft yarn in said second passage in said first layer and a weft yarn in said first passage in said second layer in a direction substantially parallel to said first and second layers, between said weft yarn in said first passage in said second layer and a weft yarn in said second passage in said second layer in a space aligned below said third passage in said first layer, under said weft yarn in said second passage in said second layer, between said weft yarn in said second passage in said second layer and a weft yarn in said third passage in said second layer, and between a weft yarn in said fourth passage in said first layer and a weft yarn in said fifth passage in said first layer;
   wherein each of said first, second, and third passages in said second layer are aligned between two adjacent ones of said first, second, third, fourth, and fifth passages in said first layer such that said passages in said second layer are offset in a longitudinal direction of the belt from said passages in said first layer.

15. The conveyor belt of claim 14 wherein each of said plurality of warp yarns is smaller in diameter than any of said plurality of weft yarns.

16. The conveyor belt of claim 15 wherein said plurality of weft yarns have substantially equal diameters.

17. The conveyor belt of claim 14 wherein said plurality of weft yarns and said plurality of warp yarns are formed from a material selected from the group consisting of polyesters, polyamides, and copolymers and blends of these polymers.

18. The conveyor belt of claim 14 wherein said plurality of weft yarns and said plurality of warp yarns are woven in a 2×1 interwoven broken twill pattern.

19. The conveyor belt of claim 14 wherein a second one of said warp yarns is woven in sequence over said weft yarn in said second passage in said first layer, between said weft yarn in said second passage in said first layer and said weft yarn in said third passage in said first layer, between said weft yarn in said third passage in said first layer and said weft yarn in said second passage in said second layer in a direction substantially parallel to said first and second layers, between said weft yarn in said second passage in said second layer and said weft yarn in said third passage in said second layer, and under said weft yarn in said third passage in said second layer.

* * * * *